INVENTORS
CLIFFORD A. LANDSNESS
RALPH F. COOPER

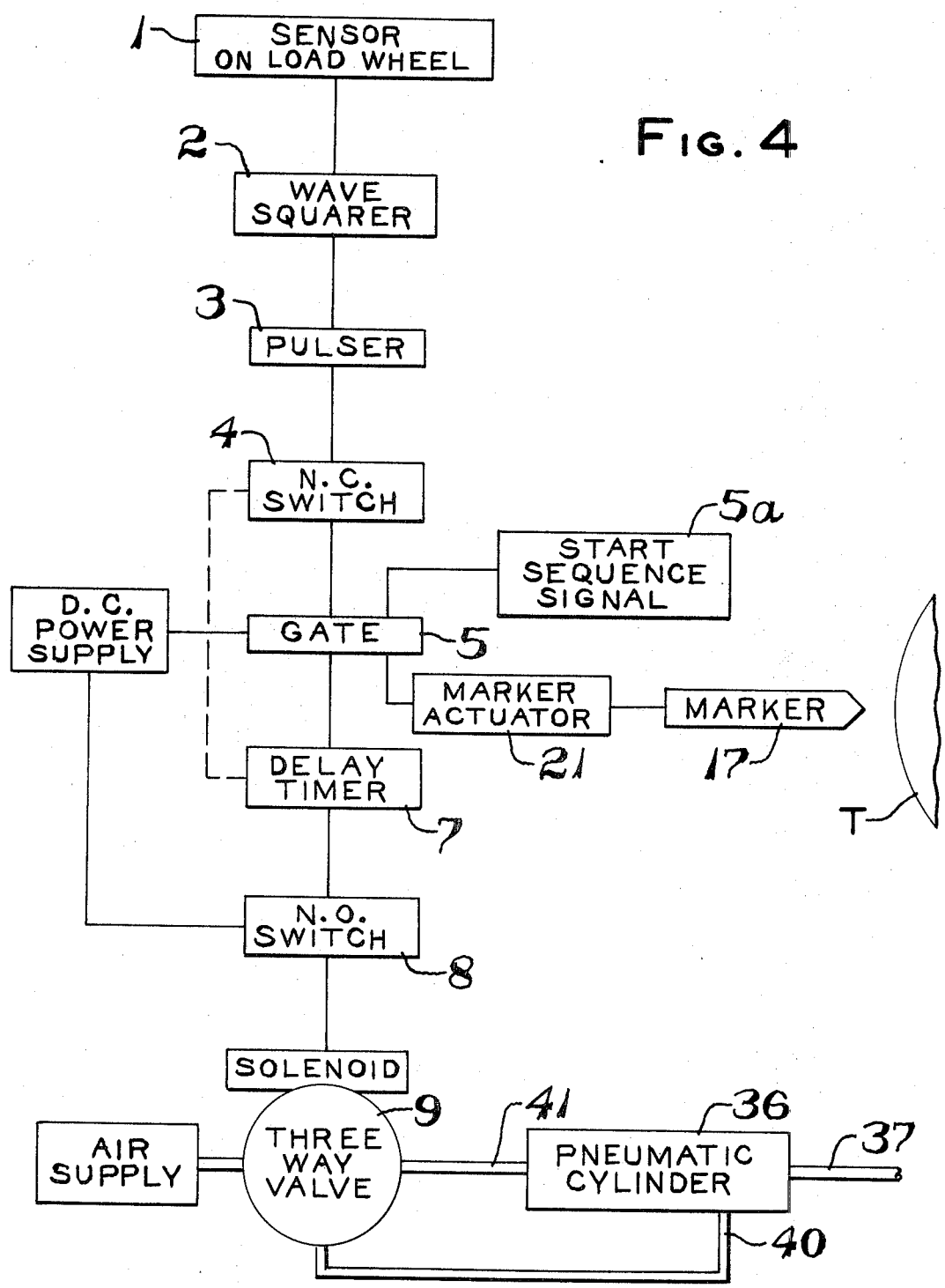

United States Patent Office 3,518,878
Patented July 7, 1970

3,518,878
APPARATUS FOR MARKING A ROTATING TIRE
Clifford A. Landsness, Akron, Ohio, and Ralph F. Cooper, Boca Raton, Fla., assignors to The B. F. Goodrich Company, New York, N.Y., a corporation of New York
Filed Nov. 25, 1968, Ser. No. 778,461
Int. Cl. B60c 19/00
U.S. Cl. 73—146                          10 Claims

ABSTRACT OF THE DISCLOSURE

An apparatus for making a mark on a rotating tire at the location corresponding to the place of maximum of the fundamental frequency of radial force variation comprising an arcuately oscillable marker mounted on a shaft having an actuator operatively connected to the shaft for rotating the marker to contact the sidewall of the tire. Rollers contacting the sidewall of the tire support the apparatus on the rotating tire.

BACKGROUND OF THE INVENTION

In the manufacture of pneumatic tires for vehicles, such as passenger automobiles, it is necessary that the finished tire have a minimum of variation in radial forces to prevent undesirable vehicle suspension oscillation when the varying radial loads are applied to the suspension through the axle about which the tire rotates. This usually requires that pneumatic tires be manufactured within prescribed limits of eccentricity, carcass flex-stiffness and lateral runout in order to control the rotational imbalance and total radial force variation on the axle.

One method of reducing prohibitive radial force variation on a vehicle wheel is that of measuring the radial force variation of the tire and rim separately and then mounting the tire such that the region corresponding to the maximum of the fundamental frequency for the tire is substantially diametrally opposed to the region corresponding to the maximum of the first harmonic of the radial force variation of the wheel rim. The tire is mounted on a wheel on the "uniformity machine" and rotated in contact with a load wheel provided with a signal generator for determining the location and amplitude of the fundamental or first harmonic of the lateral motion of the load wheel. Once the point of maximum amplitude of the first harmonic of the force variation is determined, it is desirable to mark this location on the tire sidewall to thereby facilitate mounting the tire on a vehicle wheel rim.

Heretofore, it has been extremely difficult to locate and mark on the tire the point corresponding to the peripheral location of the first harmonic of maximum radial force amplitude. Although sensors have been attached to the load wheel to provide a recordable signal trace indicating the variation in radial force, it has been quite difficult to correlate the point of maximum variation, as shown by such trace, with the peripheral location on the tire which produced the maximum point on the trace and simultaneously mark this location on the tire.

SUMMARY OF THE INVENTION

The present invention solves the above problem by providing a unique apparatus for marking on a rotating tire the point designating the peripheral region of the tire associated with the maximum of the first harmonic of the radial force variation, the marking being effected while the tire is on the "uniformity" testing apparatus thereby eliminating any requirement that tire rotation be stopped or that the wheel be dismounted from the shaft for marking.

The apparatus comprises a marker means with a means for supporting same a predetermined distance from the sidewall of the tire to be tested and includes means which permit movement of said marker into contact with the rotating tire. Means responsive to a signal representative of the occurrence of maximum radial force variation of the tire are provided for actuating and urging the marker into engagement with the tire, and means responsive to a signal are provided to move the supporting means to a position which prevents engagement of the marker with the tire after the tire has been marked.

BRIEF DESCRIPTION OF THE DRAWINGS

FIG. 4 is a block diagram of the electrical and pneumatic control system for operating the marker.

DETAILED DESCRIPTION

Figure 1:
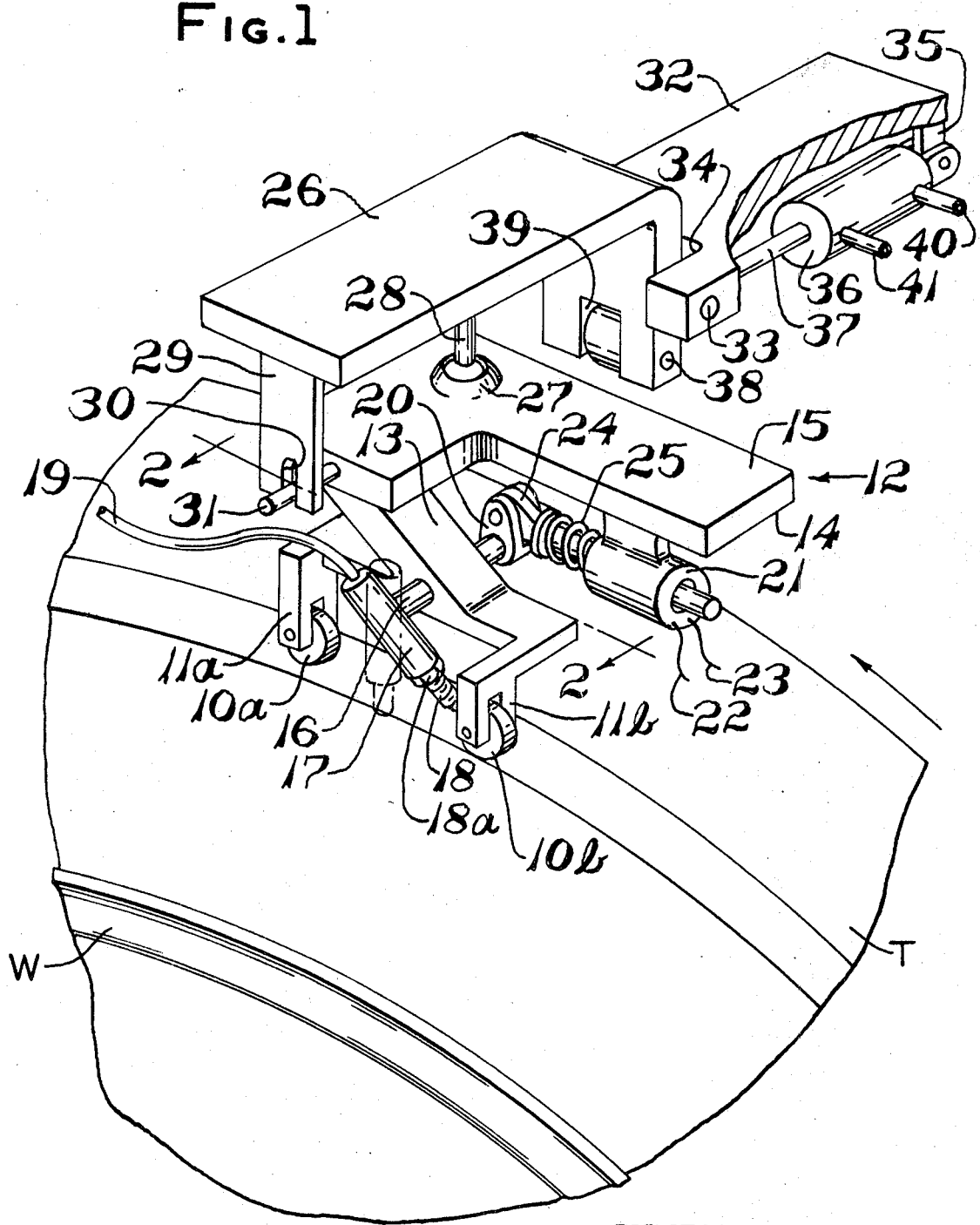
FIG. 1 is a perspective view of the tire marking mechanism shown in position on a rotating tire for marking the sidewall thereof.

In FIG. 1 of the drawings, the tire T is shown mounted on a wheel W and rotated by a power source (not shown) at a desired speed, preferably 60 revolutions per minute, against a rotatable load wheel (not illustrated). The load wheel support is provided with a transducer 1 (see FIG. 4) which produces an electrical signal representative of the changes in radial force exerted by the tire against the load wheel. The electrical signal is altered to a suitable form, for actuating the marker by conventional wave squarer 2 and pulser 3, and then is applied to the marker for moving same into contact with the tire as schematically indicated in FIG. 4. The apparatus for rotating and sensing the radial force variation may be substantially as described in the Society of Automotive Engineers paper 667B, presented Mar. 19–21, 1963, entitled "The Control of Tire Non-Uniformity and a Passenger Car Manufacturer's Point of View."

In the preferred form of the invention, the marking apparatus includes roller means, comprising a pair of spaced rollers 10a and 10b, for contacting the sidewall of the tire T. Each of the rollers 10a and 10b is rotatably mounted upon a shaft through a bifurcated lug portion 11a and 11b, respectively, extending at substantially right angles from a pedestal portion 13 of a platform 12. Each of the rollers 10a and 10b preferably has its axis of rotation aligned in a direction radially of the tire T with the rollers staggered as to their radial distance from the center of the tire T for providing a more positive register of the mechanism against the rotating tire. The rollers are each spaced on opposite sides of and preferably equidistant from the pedestal 13.

The platform 12 has a base portion plate-like in shape having two opposite generally flat surfaces 14 and 15. The pedestal portion 13 extends outwardly from the surface 14 of the base portion of the platform 12. A shaft 16 is rotatably received through the pedestal 13 with each end of the shaft extending beyond the pedestal 13. A crank 20 is attached to one end of the shaft 16 and is adapted to be operatively connected to an actuator. The shaft 16 is aligned in a direction such that its axis of rotation, if extended, will pass through the axis of the tire T and the crank 20 is attached to the end of the shaft farthest from the center of the tire T. A marker 17 is attached to the end of the shaft opposite the crank and is aligned substantially perpendicularly to the axis of the shaft. Rotation of the shaft 16 thus causes the tip of the marker to subscribe an arc in a plane perpendicular to the axis of the shaft 16.

The marker is of generally hollow cylindrical configuration and has a marking pen 18 connected to the end adjacent the tire, which pen preferably comprises a tip portion having an orifice communicating with the hollow portion of the marker and the tip is adapted for emitting marking fluid therefrom. The pen 18 is preferably threaded into the end of the marker 17 for providing linear adjustment of the pen to vary the radius of movement of the tip 18 from shaft 16. A locknut 18a is provided to secure the pen setting once the tip has been adjusted for proper contact with the surface of the tire T.

A supply tube 19 is connected to the marker 17 at the end opposite the pen 18 and communicates with the hollow portion of the marker for supplying marking fluid thereto under pressure. The marking fluid is supplied to the marker 17 under pressure by the tube 19 and is emitted from the pen 18 for marking when the pen 18 makes contact with the tire T.

The electrical actuator 21 is rigidly attached to the same flat surface 14 of the base portion of the platform 12 as is the pedestal portion 13 of the actuator. The actuator 21 preferably has an electrical solenoid coil adapted to receive an impulse signal through a pair of electrical leads 22 and 23. The actuator 21 has within the coil a magnetically permeable armature which is operatively connected to one end of a rod 24 which extends therefrom and has its free end pivotally connected to the crank 20 for producing rotation of the shaft 16. Application of a short-duration electrical impulse to the coil through terminals 22 and 23 causes the armature to be drawn away from the shaft 16 thereby rotating the crank 20 and shaft 16 to which is attached the marker 17.

The marker 17, in its inoperative state or initial position, makes an oblique angle with the sidewall of the tire, the pen tip 18 being spaced a predetermined distance from the tire and so located that when arcuately oscillated about shaft 16 by actuator 21 the pen 18 contacts the tire at generally the midpoint of its arcuate excursion. It will be noted that the actuator 21 causes the marker to move in the direction of the rotating tire, contacting briefly the surface of tire and then moving in its arcuate path beyond the point of contact with the tire. Means are provided for moving the platform 12 away from the tire so that a return spring 25, mounted on the connecting rod 24 can return the rod, crank, shaft and marker to their initial positions without "dragging" the marker on the sidewall of the tire during the return stroke after the electrical signal has completed the cycle of energizing and de-energizing the actuator.

The platform 12 is attached to a movable arm 26 by means of a swivel mount 27 attached to the flat surface 15 of the platform opposite the actuator 12. The arm 26 is preferably formed in an elongated flat configuration having an L-shape in longitudinal cross-section. The swivel mount 27 on the platform is attached to a lug portion 28 extending from the surface of the arm 26 intermediate the ends of the longer leg thereof. The swivel mount 27 is attached to the surface 15 of the platform such that the pedestal 13 is attached to the platform 12 intermediate the swivel mount and the center of the tire T. A stop portion 29 extends from the surface of the arm adjacent the platform 12 and has an elongated U-shaped slot 30 in the end thereof. A pin 31 extending from the edge of the platform 12 is slidably received in the slot such that rotational movement of the platform about the swivel mount in the plane of the flat surface 15 is prohibited by the sides of the slot. However, rotational movement of the platform is otherwise permitted about the swivel mount and is limited only by the pin 31 contacting the end of the slot 30 and the rollers 10a and 10b contacting the sidewall of the tire.

The stop is located on the arm 26 such that the pedestal 13 is attached to the platform 12 at a point intermediate the swivel 27 and the stop 29 on a line drawn therebetween. This arrangement provides that urging the arm 26 toward the tire T will cause the rollers 10a and 10b to contact the tire thus pivoting the platform 12 about the swivel mount 27 until further movement of the platform is limited by the pin 31 contacting the end of the slot 30 in the stop 29.

The arm 26 is pivotally attached to a frame 32 such that the arm 26 pivots about an axis perpendicular to the shaft 16 and parallel to the plane of rotation of the tire T. The arm is pivoted about a pin 33 received transversely therethrough intermediate the ends of the shorter leg of the arm. The pin 33 is attached to the frame 32 through sides of a cut-out portion 34 for receiving the arm 26. The frame 32 is generally of elongated flat configuration having two opposite parallel surfaces and has the cut-out 34 formed in one end thereof.

Figure 3:
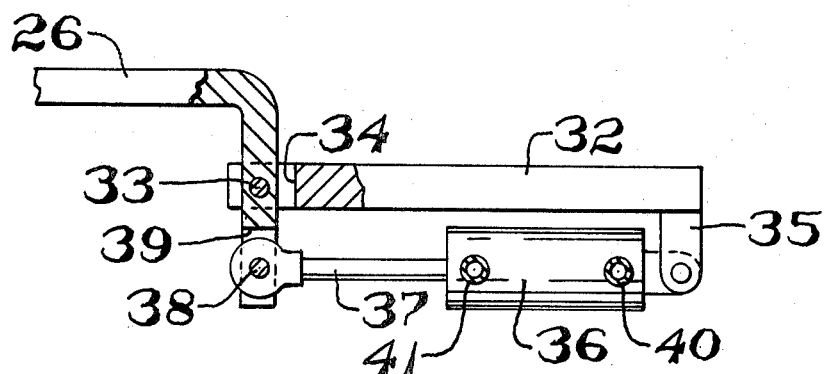
FIG. 3 is a side view of the arm and frame of FIG. 1 with a portion of each broken away to expose the pneumatic cylinder rod connections to the arm.

Referring now to FIGS. 1 and 3, a second actuator 36, preferably a pneumatic power cylinder, has an operating rod 37 extending therefrom. The actuator has the end thereof opposite the rod 37 pivotally attached to a lug 35 extending from the surface of the frame 32. The free end of the operating rod 37 is pivotally connected to the free end of the shorter leg of the arm 26 by means of a pin 38 through the end of the rod 37. In the presently preferred practice of the invention, the rod 37 is received in a slot 39 cut in the end of the arm 26.

Air under pressure is supplied to cylinder 36 through port means 40 and 41 causing the rod 37 to retract or extend from the power cylinder 36, thus moving the arm and platform toward the tire as desired for marking or away from the tire for permitting the marker 17 to return to its initial position after marking. Alternatively, however, the second actuator 36 may be a hydraulically operated power cylinder.

The operational sequence of the marker will now be described with reference to FIG. 4. The electrical signal provided by the sensor, due to radial force variations of the tire as it is rotated, is converted by the wave squarer 2 and pulser 3 into a form which provides an impulse of short duration corresponding to the maximum radial force exerted by the tire in each revolution if that force exceeds a predetermined minimum. The output from the pulser 3 is applied to an electrical gate 5 through a normally closed switch 4. Gate 5, which is conditioned for operation by a signal from a separate signal source 5a, usually from the uniformity machine programmer, or by manual excitation, is rendered conductive by an impulse from pulser 3. It then permits current from a D.C. power supply 6 to flow simultaneously to the marker actuator solenoid 21 and to preset delay timer 7. The actuator 21 causes marker 17 to rotate through its arcuate path and thereby place a mark on the rotating tire T. The marker remains in the actuated position after marking the tire, until delay timer 7 opens switch 4 cutting off power to the actuator 21 and simultaneously closes a normally open switch 8. Air under pressure from an air supply source is caused to flow to one port 41 of pneumatic cylinder 36 and upon closure of the switch 8, which energizes a solenoid operated valve 9, the air is diverted to the other port 40.

Figure 2:
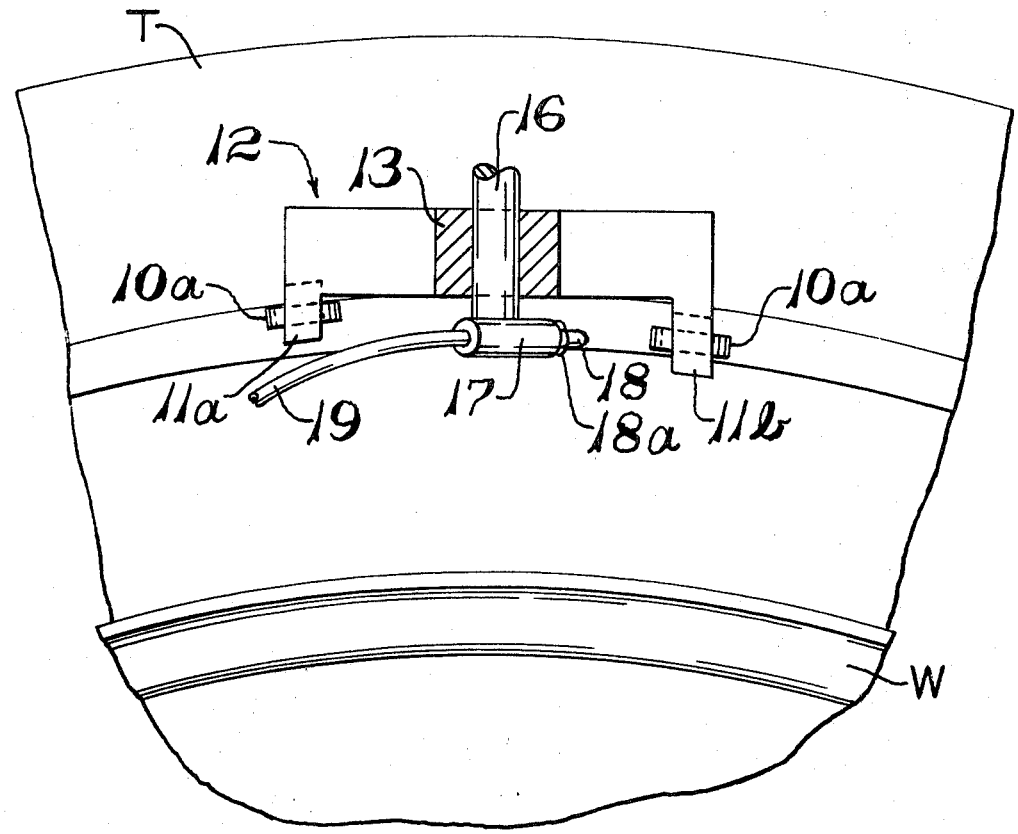
FIG. 2 is a partial sectional view taken along the section-indicating lines 2—2 of FIG. 1.

Referring to FIGS. 1, 2 and 3, it is seen that piston rod 37 connected to cylinder 36 lifts the marker assembly from the tire upon application of air pressure to the cylinder port 40. When switch 8 is in the normally open position, the solenoid operated valve 9 applies air under pressure from the supply to air cylinder port 41, thus causing the piston rod 37 to retract, thereby holding the rollers 10a and 10b in contact with the tire T. Thus, closure of normally open switch 8 causes the valve 9 to reverse the operation of air cylinder 36 and lift the marker assembly from the tire.

In the preferred practice of the invention, delay timer 7 is pre-set to actuate switches 4 and 8 within 1¼ to 1½ seconds after the electrical gate 5 conducts. When normally closed switch 4 is opened, current ceases to flow in actuator 21 and return spring 25, see FIG. 1, returns the marker 7 to its initial position before actuation.

Persons having ordinary skill in the art will be able to make modifications and adaptations in the specifically described embodiment and the invention is limited only by the spirit and scope of the appended claims.

We claim:

1. Apparatus for making a mark on the sidewall of a rotating tire at the peripheral location of the maximum radial force variation of the tire comprising:
   (a) marker means;
   (b) support means for holding said marker means a predetermined distance from the sidewall of the tire to be marked including means permitting selective movement of said marker means into contact with the rotating tire;
   (c) first actuator means responsive to a signal representative of the occurrence of maximum radial force variation of the tire;
   (d) means operatively connecting said actuator means to said marker means for moving the latter into contact with the rotating tire at the location of said maximum radial force variation; and
   (e) second actuator means operatively connected to said support means for moving the latter to a position preventing contact of said marker means with said tire.

2. The apparatus defined in claim 1, wherein said support means includes:
   (a) a platform member with roller means rotatably mounted thereon for contacting the sidewall of the tire; and
   (b) a shaft means rotatably mounted on said platform with said marker means rigidly attached thereto for arcuate movement upon rotation of said shaft.

3. The apparatus defined in claim 2, wherein said first actuator means includes a spring means for returning said marker to its initial position upon deactuation.

4. The apparatus defined in claim 2, wherein said roller means is a pair of spaced rollers with each roller having its axis of rotation aligned in a direction generally radially of the tire to be marked.

5. The apparatus defined in claim 2, wherein said support means has a frame member with an arm member pivotally attached thereto and said platform is attached to said arm by a swivel means.

6. The apparatus defined in claim 5, wherein said arm has a generally L-shaped longitudinal cross-section and said pivotal attachment to said frame member is disposed intermediate the juncture of the legs and the end of the shorter leg of said L-shape.

7. The apparatus defined in claim 5 wherein said arm has a stop means attached thereto for limiting the movement of said platform about said swivel connection.

8. The apparatus defined in claim 2, wherein said first actuator means is a solenoid coil rigidly attached to said support means which coil has an armature rod operatively connected to said shaft means.

9. The apparatus defined in claim 1, wherein said second actuator means is a pneumatic power cylinder having one end pivotally attached to said frame means and having an operating piston rod extending therefrom which rod is pivotally connected to said arm.

10. The apparatus defined in claim 1, wherein said marker is hollow and has a tip with an orifice for emitting marking fluid supplied to said marker under pressure.

References Cited

UNITED STATES PATENTS 3,375,714   4/1968   Bottasso _____ 73—146

DONALD O. WOODIEL, Primary Examiner